United States Patent [19]

Harrell

[11] Patent Number: 5,078,364

[45] Date of Patent: Jan. 7, 1992

[54] CARRIAGE LOCK MECHANISM FOR PORTABLE CABLE HOIST

[75] Inventor: Jerry J. Harrell, Conroe, Tex.

[73] Assignee: Sumner Manufacturing Co., Inc., Houston, Tex.

[21] Appl. No.: 558,226

[22] Filed: Jul. 26, 1990

[51] Int. Cl.$^5$ .............................................. B60P 1/02
[52] U.S. Cl. ................................ 254/387; 254/4 R
[58] Field of Search ............... 254/2 R, 2 C, 4 R, 4 C, 254/325, 326, 327, 335, 336, 387; 280/47.2, 47.29, 641; 74/527, 529

[56] References Cited

U.S. PATENT DOCUMENTS

| | | | |
|---|---|---|---|
| 2,983,474 | 5/1961 | Hanna | 254/4 C |
| 3,337,187 | 8/1967 | Sumner | 254/387 |
| 4,508,316 | 4/1985 | Millard | 254/387 X |
| 4,771,988 | 9/1988 | Scroggins, Sr. | 254/336 |
| 4,802,681 | 2/1989 | Hung | 280/47.2 X |
| 4,971,292 | 11/1990 | Craig | 254/7 R |

FOREIGN PATENT DOCUMENTS

| | | | |
|---|---|---|---|
| 8800111 | 8/1989 | Netherlands | 254/2 R |
| 707312 | 4/1954 | United Kingdom | 254/387 |

Primary Examiner—John M. Jillions
Attorney, Agent, or Firm—James L. Jackson

[57] ABSTRACT

A portable plural telescoping mast cable hoist mechanism is provided which incorporates a single cable for telescopically extending and retracting the mast sections and for controlling movement of a load handling carriage. A carriage lock mechanism is provided to prevent inadvertent movement of the carriage and movable mast sections while the cable hoist mechanism is being transported or otherwise moved about while positioned on its side. The carriage lock mechanism incorporates a freely pivotal carriage lock having a hook at its lower end which is normally positioned out of locking engagement with a locking pin and which is pivoted by gravity into locking engagement with the locking pin while the unit is lying on its side for transportation and handling, thereby securing the carriage and mast sections against inadvertent movement.

16 Claims, 3 Drawing Sheets

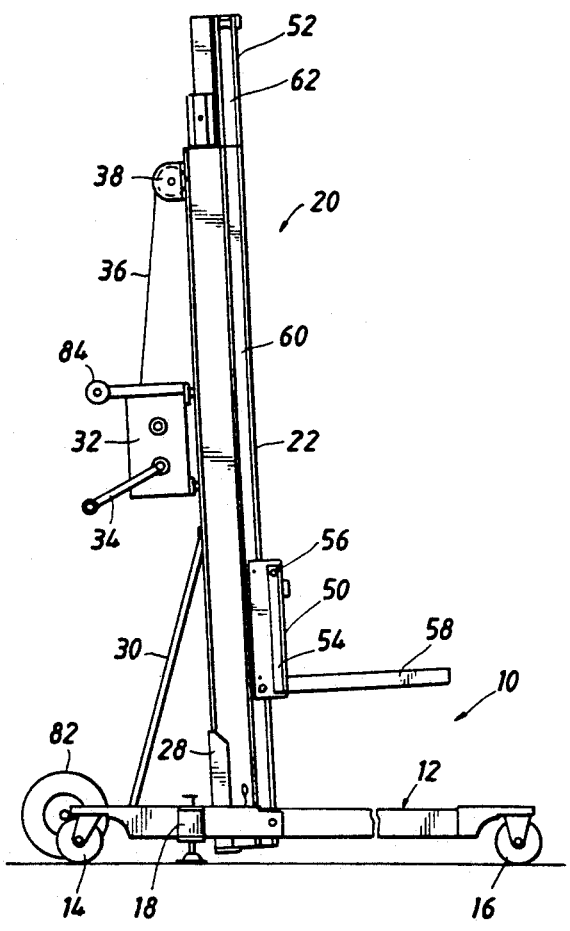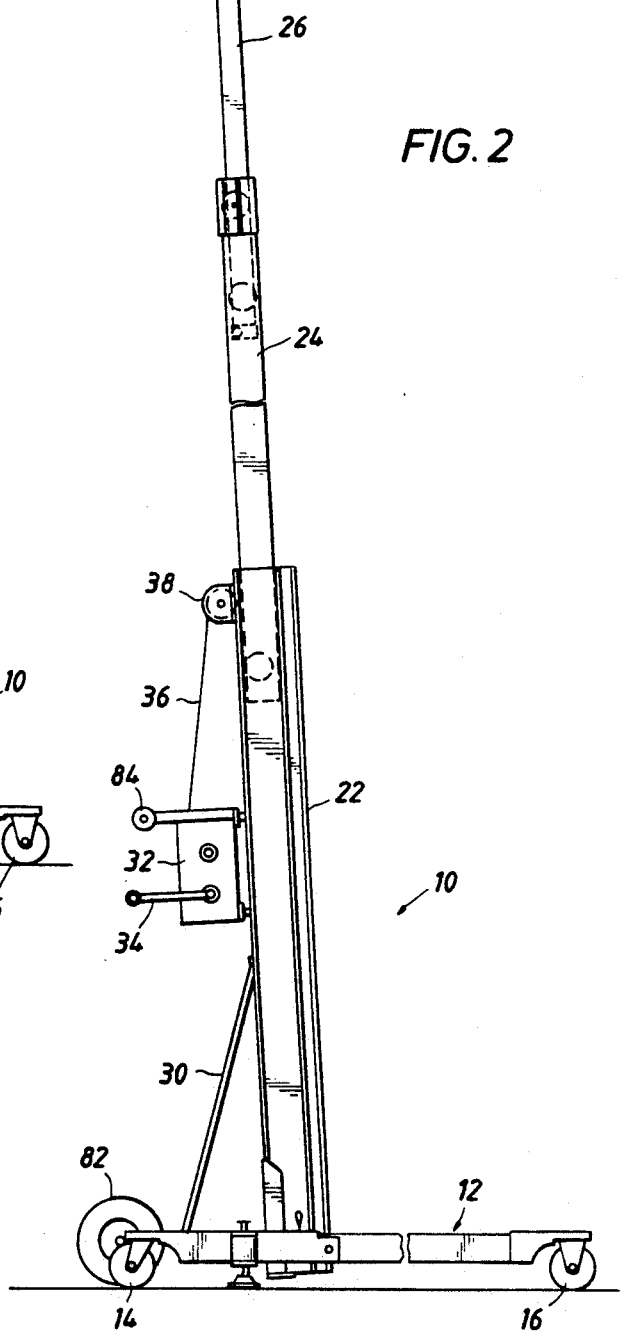

CARRIAGE LOCK MECHANISM FOR PORTABLE CABLE HOIST

FIELD OF THE INVENTION

This invention relates generally to hoisting mechanisms and more particularly to a hoist mechanism incorporating a movable cable operated carriage for supporting and elevating loads, wherein the hoist mechanism incorporates a carriage locking mechanism for securing the carriage in its lowermost position relative to the mast structure of the hoist to restrain the carriage against movement when the hoist is lying on its side for purposes of storage and transportation.

RELATED INVENTION

The subject matter hereof relates to the subject matter of U.S. Pat. application Ser. No. 07/478,913 filed on Feb. 12, 1990 in the name of JERRY J. HARRELL and entitled PORTABLE THREE MAST CABLE HOIST MECHANISM.

BACKGROUND OF THE INVENTION

Various cable hoist devices have been developed over the years which incorporate a plurality of telescopically arranged masts which are capable of being elevated to substantial heights for lifting loads. One such such extensible hoist is set forth in U.S. Pat. No. 3,337,187 of J.D. Sumner. Another three masted cable hoist is set forth in U.S. Pat. No. 4,508,316 of Millard.

Although the present invention is discussed particularly as it relates to three masted cable hoists, it is to be born in mind that such is not intended to limit the scope of the present invention. The present invention is readily applicable to all types of cable hoists that incorporate movable load supporting cable operated carriages that are disposed in movable relation with a mast structure.

Although all cable hoist mechanisms operate for the lifting of loads with the mast structure thereof disposed in upstanding position, certain cable hoists are capable of lying on their sides to render them sufficiently portable so that they may be hauled in small vehicles and efficiently stored and handled in small spaces. Although most cable hoist mechanisms of this nature can readily be positioned on their sides for storage, certain problems exist when these hoists are being transported. Because the hoists incorporate a plurality of masts that are operated by one or more cables for extension and retraction, when the hoist is positioned on its side, the masts can become inadvertently extended, sometimes to the point that the upper masts sections can become completely disassembled from the lower mast section. This becomes a particular hazard from the standpoint of transportation because the vibration of transportation tends to cause inadvertent separation of the mast sections in the event they are not restrained in some fashion. Obviously, when the mast sections become completely separated, the cable can become mispositioned with respect to the sheaves of the mast sections such that reassembly of the hoist becomes very difficult and time consuming. Further, it is possible that the mast sections can become damaged if they should become completely separated during transportation. It is desirable, therefore, to provide a cable hoist mechanism incorporating a facility for positively securing the cable hoist in its collapsed position and to positively insure its inadvertent extension of the mast sections while the hoist is lying on its side during transportation or storage.

SUMMARY OF THE INVENTION

It is a principle feature of the present invention to provide a novel cable hoist mechanism which incorporates means for locking the mast section and carriage of the cable hoist to insure against inadvertent movement of the carriage and mast sections such as during transportation or storage when the hoist mechanism is positioned on its side.

It is another feature of this invention to provide a mast locking system for cable hoists that automatically becomes operative upon positioning of the hoist mechanism on its side to thus insure that the hoist mechanism remains locked in its collapsed condition and is thus prevented from inadvertent extension.

It is also a feature of this invention to provide a novel telescoping mast cable hoist mechanism incorporating a carriage and mast locking assembly which automatically assumes an unlocked position when the cable hoist mechanism is positioned upright.

Briefly, the invention relates to a cable actuated hoist mechanism incorporating a bottom mast which is fixed in upstanding relation to a wheel mounted base structure and which forms an internal mast receptacle. The bottom mast section also forms external carriage guide means extending substantially along the entire length of the bottom mast. An intermediate mast is provided which is movably received in telescoping relation within the mast receptacle of the bottom mast. The intermediate mast also forms a mast receptacle capable of receiving the top mast in telescoping relation therein. The top mast is provided with a carriage housing assembly that is fixed at its upper end. A carriage assembly including support means such as a load support fork thereon for supporting a load is movably receivable in guided relation by carriage guide tracks of the bottom mast for guided movement along the length of the bottom mast. The carriage assembly is also receivable in nested, secured relation with the carriage housing assembly of the top mast when the mast sections are elevated. The load supporting carriage is enabled by its guided relation with the bottom mast and its supported relation with the carriage housing to be moved from near ground level to the highest elevation reached by the top most section.

A winch is fixed externally of the bottom mast, intermediate the length thereof and incorporates a single cable drum and drum drive mechanism which may be actuated manually or by means of any suitable motor mechanism. About the cable drum of the winch assembly is wound a single hoist drive and load support cable which is extended sequentially about the first cable sheaves or pulleys of the bottom mast, the top mast and the carriage assembly. The dead end of the cable is fixed to the upper end of the upper mast or to the carriage housing assembly as desired. Thus, actuation of a single cable accomplishes section, guided lock supported carriage movement along the bottom mast transfer of the carriage from the bottom mast section to the top mast and telescoping extension or contraction of the movable mast section.

According to the present invention, the movable carriage of the cable hoist mechanism incorporates a carriage lock which is supported for free pivotal movement by means of a pivot member such as a shaft which is disposed in transverse relation with the direction of normal movement of the carriage. At the lower portion of the base structure or mast is provided a fixed locking element, such as a locking pin or other suitable locking element, which is positioned in offset relation with respect to the carriage lock when the cable hoist mechanism is disposed in its operative, upstanding position. When the cable hoist mechanism is positioned on its side, such as for storage or transportation, the carriage lock becomes pivotally positioned by gravity such that a hook located at the lower end thereof becomes engaged with the carriage locking pin. The interengaging relation between the carriage lock and the carriage locking pin when the carriage is located on its side positively secures the carriage against movement toward the carriage housing. The base structure of a stop at the lower end of the bottom mast limits movement of the carriage toward the base. Thus the carriage locking mechanism secures the carriage in substantially immovable relation with the base structure of the hoist Since the carriage mechanism is restrained against movement by this carriage locking mechanism, the telescoping masts of the cable mast are also restrained against inadvertent movement by the cable which is in turn restrained by the carriage Therefore, when the cable hoist mechanism is positioned on its side the carriage locking mechanism automatically engages and functions to positively secure the hoist mechanism in its collapsed position. Inadvertent carriage movement and mast extension cannot occur during handling and transportation of the hoist while supported by its side wheels. When the cable hoist mechanism is again positioned in its upright operative position, the freely movable carriage locking element will automatically pivot to its inoperative or unlocked position. Thus, without requiring manipulation of the carriage lock, the cable hoist mechanism is readily operative for lifting loads when in its upright operative position and is automatically locked to prevent movement of the carriage and telescoping masts when the cable hoist is lying on its side.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is an elevational view of a cable hoist mechanism constructed in accordance with the present invention and showing the apparatus in the fully collapsed position thereof.

FIG. 2 is an elevational view of the cable hoist mechanism of FIG. 1, showing positioning of the cable hoist mechanism with its masts substantially fully extended.

DETAILED DESCRIPTION OF THE PREFERRED EMBODIMENT

Figure 3:
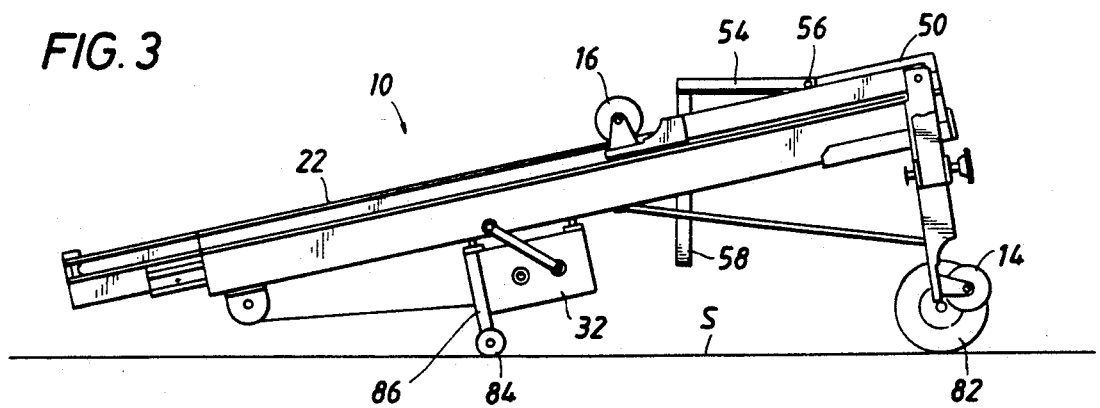
FIG. 3 is an elevational view of the cable hoist system of FIGS. 1 and 2, illustrating the position of the apparatus in its collapsed position and lying on its side for movement on the lateral wheels thereof.
Figure 4:
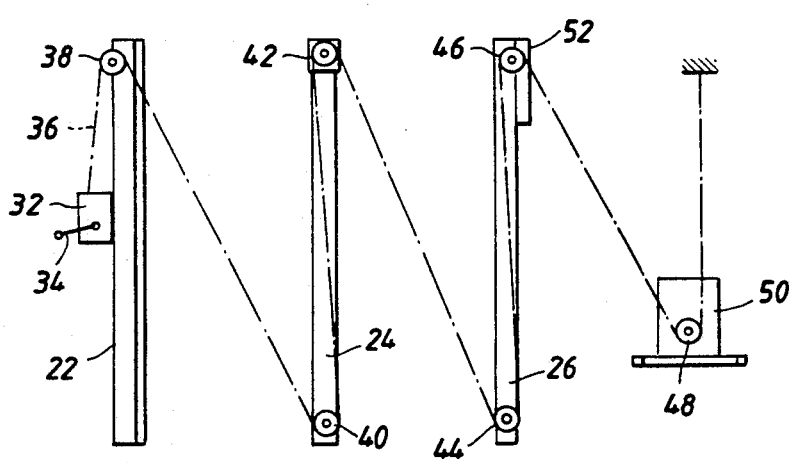
FIG. 4 is a mechanical diagrammatic illustration of the bottom, intermediate and top masts of the cable hoist mechanism and showing by way of broken lines, orientation of the lifting and load supporting cable in respect to the cable pulleys of the respective masts and the carriage assembly.

Referring now to the drawings and first to FIGS. 1-3, a cable hoist mechanism constructed in accordance with the present invention is illustrated generally at 10 and is shown at the upright and substantially fully lowered position thereof in FIG. and at the upright and substantially fully extended position thereof in FIG. 2. The cable hoist mechanism is also shown in FIG. 3 as collapsed and lying on its side such as for mobile handling in confined spaces, for transportation, such as in small trucks and for storage in confined spaces.

The cable hoist mechanism 10 incorporates a base structure shown generally at 12, having casters 14 and 16 provided thereon to render the hoist mechanism mobile to facilitate its versatility on any particular job site. The mobile base structure 12 may also incorporate outrigger elements 18 which render it stable during use.

A mast assembly is illustrated generally at 20 and incorporates a bottom mast section 22, an intermediate mast section 24 and a top mast section 26. The bottom mast section 22 has its lower end received and supported by a structural mast seat 28 which is fixed in any suitable manner to the base structure 12. The mast seat 28 is inclined to provide the extended mast assembly with a sufficient degree of inclination so that the load shown in broken lines in FIG. 2 is supported in substantially vertically centered relation with the base structure. Mast stabilizers 30 are provided which are secured at respective ends to the base structure and to the lower mast section to provide the cable hoist with further stabilization relative to the mobile base structure 12.

Figure 5:
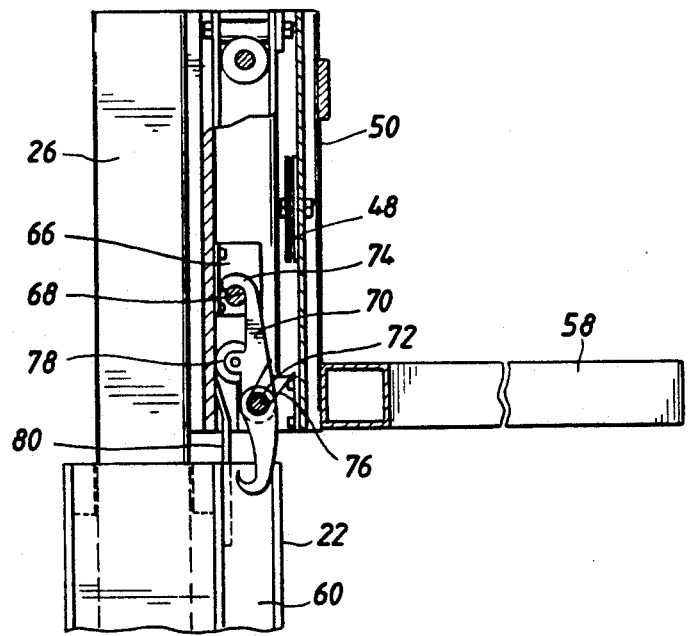
FIG. 5 is a sectional view of the carriage assembly and carriage housing assembly in the nested relation thereof.
Figure 6:
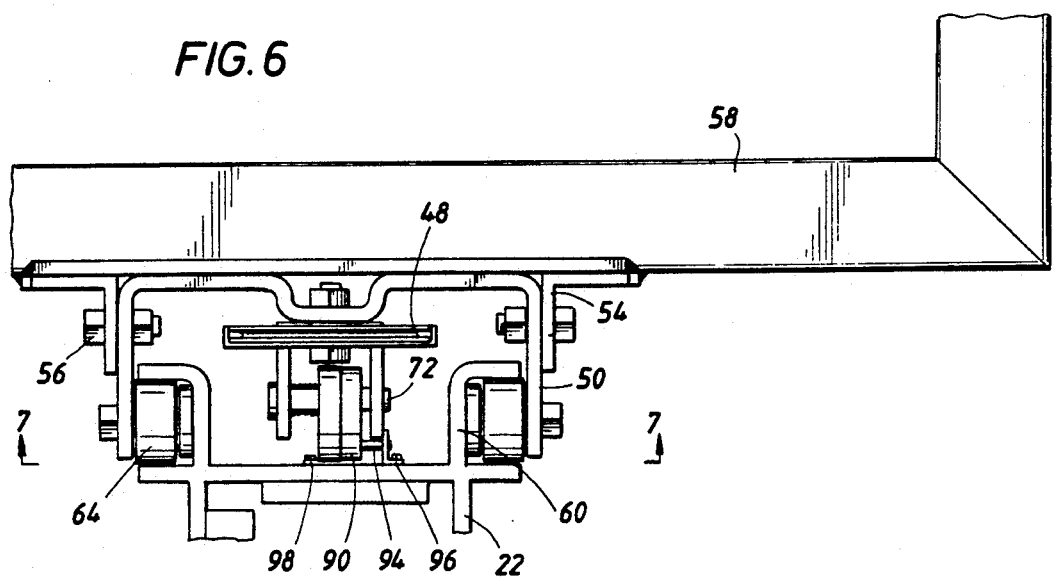
FIG. 6 is a partial plan view of the cable hoist mechanism of FIGS. 1 and 2.

A winch mechanism 32 is fixed to the rear side of the lower mast section 22 in the manner shown in FIGS. 1 and 2 and is intended for manual operation by means of a winch handle 34 but may readily be adapted for motor operation as well such as by means of an electric motor. From the winch mechanism extends a single cable 36 which is extended about sheaves 38, 40, 42, 44 and 46 of the mast sections 22, 24 and 26 and about the sheave 48 of a movable carriage 50. By manually rotating the crank 34 of the winch 32, the single cable 36 is operated resulting in movement of the carriage relative to the mast structure and relative to a carriage housing 52 supported by the top mast 26 and induces telescoping movement of the mast sections upwardly or downwardly depending upon the direction of winch movement As shown in greater detail in FIGS. 1 and 2, the carriage 50 is provided with a generally L-shaped load support including vertical arms 54 that are pivotally connected to the upper portion of the carriage by means of pivots 56 and transverse arms 58 that project outwardly and provide support for the load L. The lower mast section 22 forms opposed guide tracks 60 which are more clearly evident in the broken line illustration of FIG. 6. The carriage housing 52 also defines opposed guide tracks 62 which in the completely collapsed condition of the cable hoist, are disposed in coextensive relation with the opposed guide tracks 60 The carriage 50 is provided with pairs of guide rollers 64 on each side thereof which are received within the respective guide tracks in the manner shown in FIG. 6. At its uppermost position relative to the top mast section 26, the carriage 50 is disposed in nested relation with the carriage housing 52. As the cable is moved for telescoping extension of the masts from the position shown in FIG. 1 to the position shown in FIG. 2, initial movement of the cable will induce upward movement of the carriage along the guide track 60 into the guide track 62 of the carriage housing. After this has been accomplished, further movement of the cable will induce upward movement of the mast sections 24 and 26, such upward movement continuing until the intermediate and upper mast sections have been fully extended to the positions shown in FIG. 2. During lowering of the intermediate and top masts by reversing the direction of cable movement, the carriage remains in nested relation with the carriage housing, thus stabilizing the load until the carriage housing has moved into engagement with the upper end of the lower mast section 22. Thereafter, further movement of the cable will permit the carriage to leave its nested relation with the carriage housing and proceed downwardly along the guide track 60 until the lower portion of the carriage has engaged a lower stop provided therefor To insure that the carriage 50 remains in assembly with the carriage housing during the period when the upper mast section 26 is elevated, the carriage housing is provided with a pair of latch support brackets 66 which provide support for a transversely oriented latch pin 68. A carriage latch element 70 is provided which is pivotally supported by a transverse pivot member 72 of the carriage. The carriage latch element is provided with a hook portion 74 at its upper end which is urged toward latching engagement with the latch pin 68 by means of a torsion spring 76 which is supported about the transverse pivot member 72. To insure unlocking of the latch relative to the pin 68, the carriage latch element 70 is provided with an unlocking roller S which is disposed for engagement with the tapered upper end of an unlocking cam 80 which is supported by and projects above the upper end of the lower mast section 22. As shown in FIG. 5, as the carriage and carriage housing are moved downwardly along with the upper mast section 26, just before contact is made between the carriage housing and the upper end of the lower mast section 22, the unlocking roller 78 will contact the tapered upper end of the unlocking cam 80 and rotate the carriage latch element 70 clockwise about its pivot 72, thereby retracting the hook portion 74 from its locking engagement with the latch pin 78. This unlocking movement will then permit the carriage to move downwardly along the guide tracks 60 after the carriage housing has engaged the upper end of the lower mast section.

As mentioned above, and as shown in FIG. 3, the cable hoist mechanism of this invention is capable of being lowered to a position on its side, at which position it is supported by a pair of large wheels 82 which are supported by the base structure 12 and a pair of smaller wheels 84 which are supported by wheel supports 86 that are secured to and project from the housing structure of the winch 32. While resting in this side-oriented position a shown in FIG. 3, the load support elements 54 and 58 may be pivoted about pivot 56 of the carriage 50 to an out-of-the-way position where the transverse load supports 58 are oriented downwardly to minimize the height of the winch unit when lying on its side. In this position, the winch unit may be moved along the surface "S" of the work site on its side support wheels 82 and 84. Alternatively, the left hand end of the winch unit may be grasped and raised, thus lifting the small wheels 84 from the surface "S" and allowing the winch unit to be moved about with the large wheels 82 in contact with the surface "S".

As also mentioned above, in the side oriented position of the unit as shown in FIG. 3, especially during transportation of the cable hoist mechanism, the vibration of transportation can tend to allow the carriage 50 to move to the left toward the carriage housing from its fully lowered position relative to the lower mast section. When the carriage 50 is allowed to move toward the carriage housing in this manner, the cable that maintains the movable mast sections 24 and 26 in immovable relation with the lower mast section 22 will become slack, thereby also allowing inadvertent extension movement of the intermediate and upper mast sections.

Figure 7:
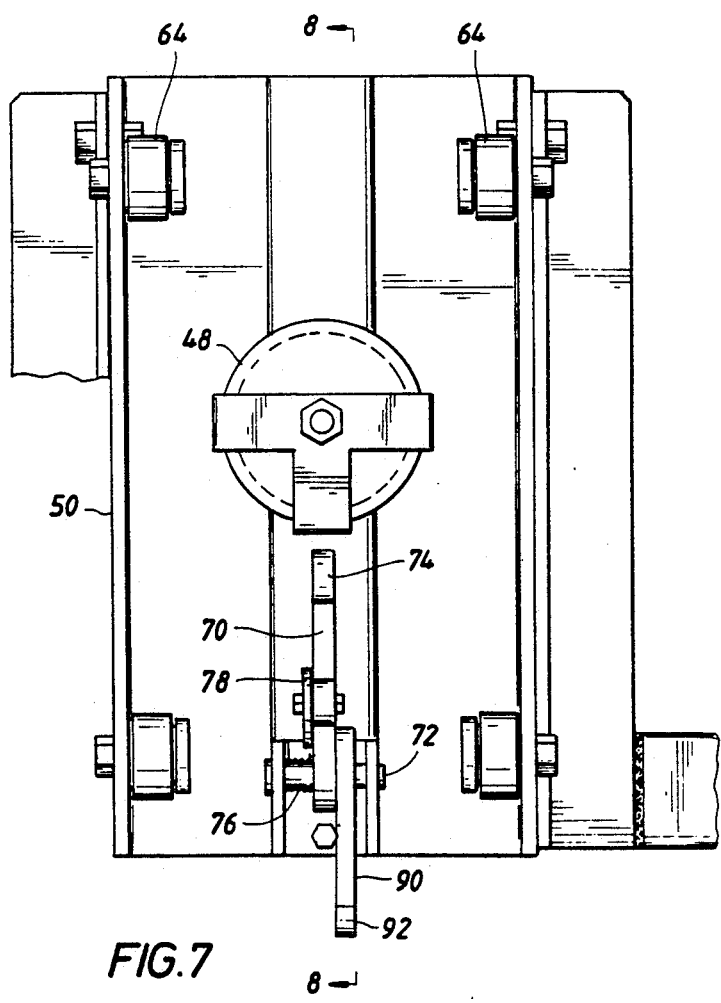
FIG. 7 is a rear view of the carriage assembly taken along line 7—7 of FIG. 6 and showing the carriage lock mechanism at the lower central portion thereof.

In fact, the cable can become sufficiently slack that the upper and intermediate mast sections can become completely disassembled from their respective telescoping relations with the lower mast section. When this condition occurs it is extremely difficult and time consuming to reassemble the telescoping mast sections and the cable in proper relation for operation of the cable hoist mechanism. It is desirable, therefore, to insure against inadvertent movement of the carriage 50 relative to the lower mast section with the cable hoist mechanism lying in its side oriented position as shown in FIG. 3. One suitable means for efficiently accomplishing this desired result may conveniently take the form of a carriage look assembly that automatically establishes a positive locking relation between the carriage and the lower mast section or with the base structure of the cable hoist mechanism when the cable hoist is lying on its side and supported by the side wheels. As shown in the lower portion of FIG. 5 and in FIGS. 6, 7 and 8, the carriage lock mechanism may incorporate a carriage lock 90 which is pivotally supported by the transverse pivot pin member 72 and which defines a hook element 92 at the lower portion thereof which is disposed for locking engagement with a carriage locking pin 94 which is oriented transversely to the carriage lock 90 and which is supported by a pair of brackets 96 and 98 which are bolted or other wise fixed to the lower end of the lower mast section 22. The locking pin 94 is positioned in laterally offset relation with the orientation of the hook 92 when the hoist is upright.

Figure 8:
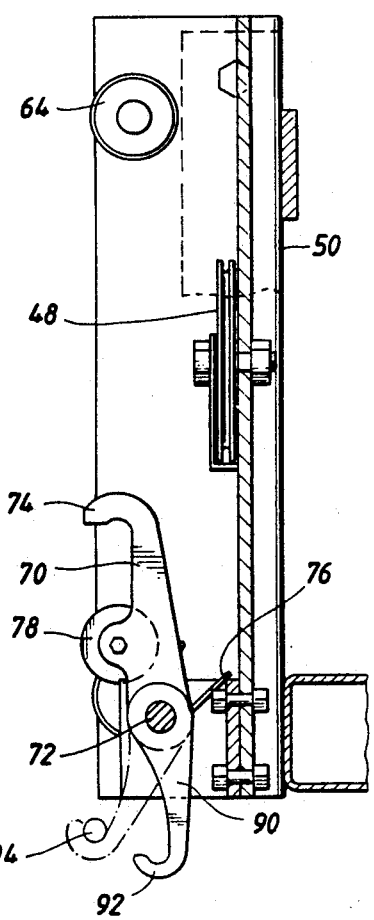
FIG. 8 is a sectional view taken along line 8—8 of FIG. 7 and showing the unlocked position of the carriage lock in full lines and the locking position of the carriage lock in broken lines.

The carriage lock 90 is supported for free pivotal movement by the pin member 72 and is positionable by gravity depending upon the orientation of the cable hoist mechanism. While the cable hoist is operatively positioned or upright as shown in FIGS. 1 and 2, the carriage lock 90 is positioned by gravity at the full line position of FIG. 8 where its hook 92 is disposed out of locking engagement with the carriage locking pin 94. When the cable hoist mechanism is positioned on its side as shown in FIG. 3, and supported by its side support wheels 82 and 84 the carriage lock 90 will be pivoted by gravity to its broken line position as shown in FIG. 8, thus positioning the hook 92 thereof in locking engagement with the carriage locking pin 94. Should the carriage 50 have any tendency, due to vibration or other activity, to move from its position as shown in FIG. 3 toward the upper end of the bottom mast section 22, such carriage movement will be restrained by the interengaging relation of the hook portion 92 of the carriage lock 90 with the carriage Lock pin 94. The cable of the cable hoist will therefore be maintained taut, thereby insuring that the intermediate and top mast sections of the cable hoist will remain in the telescopically collapsed positions thereof as shown in FIGS. 1 and 3. During transit and handling, therefore, regardless of the vibration that occurs, the various components of the cable hoist mechanism will remain in the positions shown in FIGS. 1 and 3 and thus when subsequently used, will not require any degree of adjustment to insure proper positioning of the cable and mast sections of the unit.

In view of the forgoing, it is seen that the present invention is well adapted to attain all of the features hereinabove set forth together with other objects and features which are inherent in the apparatus itself.

While the foregoing is directed to the preferred embodiment it is recognized that the apparatus may take on various other embodiments within the spirit and scope of the invention, the scope hereof is determined by the claims which follow.

What is claimed is:

1. A portable cable hoist mechanism having a carriage lock, comprising:
   (a) a base structure having base support wheels and side support wheels;
   (b) a mast projecting upwardly from aid base structure and having a base section being fixed to said base structure and having a plurality of movable mast sections disposed in telescoping relation and forming an upper end of said mast, said mast further having a load supporting carriage disposed in movable guided relation thereon, said portable cable hoist mechanism being selectively positionable at an upright position supported by said base support wheels of said base structure and being positionable at a side position supported by said said side support wheels;
   (c) a winch and cable assembly for imparting telescoping extension and construction of said mast and for controlling movement of said load supporting carriage relative to said mast;
   (d) a locking element being disposed in immovable relation with said mast; and
   (e) a hoist position responsive carriage lock being movably supported by said carriage and being automatically positionable at a first position out of latching engagement with sad locking element to permit unrestrained movement of said load supporting carriage in a direction toward said upper end of said mast when said portable cable hoist mechanism is at said upright position and supported by said base support wheels and being automatically positionable at a second position in latching engagement with said locking element to prevent movement of said load supporting carriage in a direction toward said upper end of said mast when said portable cable hoist mechanism is at said side position supported by said side support wheels.

2. The portable cable hoist of claim 1, including:
   (a) side support wheels being provided on said portable cable hoist;
   (b) said carriage lock being positionable at said first position when said portable cable hoist is supported in its upright position by said base structure; and
   (c) said carriage lock being positioned at said second position when said portable cable hoist is supported by said side support wheels.

3. The portable cable hoist of claim 1, therein:
   said carriage lock is supported for free pivotal movement relative to said mast and is movable by gravity to said first and second positions responsive to positioning of said portable cable hoist at said upright and said supported positions.

4. The portable cable hoist of claim 1, including:
   a carriage housing being fixed to the upper extremity of the uppermost one of said mast sections, said locking element being supported by said carriage housing.

5. The portable cable hoist of claim 1, including:
   (a) a carriage housing being provided at the upper end o the uppermost one of said mast sections;
   (b) said carriage being receivable in laterally supported relation by said carriage housing upon movement of said carriage to the upper end of said mast and remaining in said laterally supported relation during telescoping elevation of said mast sections; and
   (c) a pivot being supported by said carriage and pivotally supporting said carriage lock.

6. The portable cable hoist of claim 5, wherein:
   said carriage lock is supported of free pivotal movement by said pivot.

7. The portable cable hoist of claim 5, wherein:
   said carriage lock is gravity operated, said carriage lock being automatically positionable at said first position by gravity when said cable hoist mechanism is upright and being automatically positioned at said second position when said cable hoist mechanism is at said side position.

8. The portable cable hoist of claim 5, including:
   (a) a carriage latch pin being supported in immovable relation by said carriage housing;
   (b) a carriage latch being pivotally supported by said pivot and establishing latching engagement with said carriage latch pin upon movement of said carriage into said laterally supported relation with said carriage housing; and
   (c) means supported by said mast for releasing said carriage latch from said latch pin upon full collapsing movement of said mast sections.

9. The portable cable hoist of claim 8, including:
   means for urging said carriage latch to said latching engagement with said carriage latchpin.

10. The portable cable hoist of claim 8, wherein:
    (a) a cam member is supported by said carriage latch; and
    (b) a cam being provided on said mast and upon being contacted by said cam member developing a force on said carriage latch moving said carriage latch to a position releasing said carriage latch from latching engagement with said carriage latch pin.

11. The portable cable hoist of claim 1, wherein:
    (a) said carriage lock is freely pivotally supported by said carriage and is positionable at said first and second positions by gravity responsive to the position of said cable hoist; and (b) said locking element being positioned in laterally offset relation with said carriage Lock when said cable hoist is at its upright position and being pivoted by gravity to said second position in locking engagement with said carriage lock when said cable hoist is positioned on its side.

12. The portable cable hoist of claim 11, wherein:
(a) said locking element being a locking pin; and
(b) said carriage lock forming a hook establishing hooking engagement with said locking pin at said second position of aid carriage lock.

13. A portable cable hoist mechanism having a carriage lock, comprising:
(a) a base structure having wheels for mobile support thereof;
(b) a mast structure having a bottom mast section fixed to said base structure and extending upwardly from said base structure and a plurality of movable mast sections disposed in telescoping relation;
(c) a carriage housing being fixed to the upper end o the uppermost one of said movable mast sections;
(d) a load supporting carriage being movably supported by said mast structure and being receivable in nested relation with said carriage housing;
(e) a winch being fixed to said bottom mast section and having cable engaging pulleys on said mast sections and said carriage and being operable for controlling telescoping movement of said movable mast sections and movement of said carriage;
(f) side wheel means for supporting said portable cable hoist mechanism when said cable hoist mechanism is positioned on one side thereof for support by said side wheel means;
(g) a locking element being provided on aid mast structure; and
(h) a carriage lock being movably supported by said carriage and being out of locking engagement with said locking element when said portable cable hoist is upright and being positioned in locking engagement with said locking element responsive to positioning of said cable hoist for support by said side wheel means to thus prevent carriage movement toward said carriage housing and to prevent telescoping extension of said movable mast sections.

14. The portable cable hoist mechanism of claim 13, wherein:
said carriage lock i supported for free pivotal movement relative to aid carriage and being positionable by gravity at a first position permitting unimpeded movement of said carriage when said portable cable hoist is upright and being positionable by gravity at a second position establishing carriage locking engagement of said carriage lock with said locking element when said cable hoist is supported by said side wheel means.

15. The portable cable hoist mechanism of claim 14, wherein:
(a) said carriage lock is freely pivotally supported by said carriage and is positionable at said first position and said second position by gravity responsive to the position of said cable hoist; and
(b) said carriage lock being positioned in laterally offset relation with said locking element when said cable hoist is at said first position thus permitting unrestricted extension of aid mast structure and being pivoted by gravity to said second position in locking engagement with said locking element when said cable hoist is positioned for support by said side wheel means.

16. The portable cable hoist mechanism of claim 15, wherein:
(a) said locking element is a locking pin; and
(b) said carriage lock forming a hook establishing hooking engagement with said locking pin at said second position of said carriage lock.

* * * * *